United States Patent [19]

Graber

[11] 4,432,479
[45] Feb. 21, 1984

[54] VEHICLE ATTACHED CARRIER

[76] Inventor: Joseph V. Graber, 3739 County Trunk M, Middleton, Wis. 53562

[21] Appl. No.: 506,815

[22] Filed: Jun. 22, 1983

[51] Int. Cl.³ ............................................. B60N 11/00
[52] U.S. Cl. .................................... 224/322; 224/329; 224/331
[58] Field of Search ............... 224/322, 309, 315, 325, 224/329, 331

[56] References Cited

U.S. PATENT DOCUMENTS

| 2,663,472 | 12/1953 | Belgau | 224/325 X |
|---|---|---|---|
| 3,109,569 | 11/1963 | Hare | 224/331 X |
| 3,465,929 | 9/1969 | Chorey | 224/329 X |
| 3,901,421 | 8/1975 | Kalicki et al. | |
| 3,994,425 | 11/1976 | Graber | |
| 4,039,106 | 8/1977 | Graber | |
| 4,101,061 | 7/1978 | Sage et al. | 224/322 |
| 4,345,705 | 8/1982 | Graber | |

Primary Examiner—Steven M. Pollard
Attorney, Agent, or Firm—Vernon J. Pillote

[57] ABSTRACT

A vehicle attached carrier for mounting on the roof or trunk lid of a vehicle. The carrier includes a plurality of vehicle engaging devices for supporting a load support on the surface of the vehicle. The vehicle attaching devices each include an elongated load distributing member having a pair of relatively parallel pivot pins extending crosswise adjacent opposite ends. The load distributing member is attached intermediate its ends to the load support to transmit downwardly applied forces substantially equally to both pivot pins. First and second foot members are mounted on the pivot pins for pivotal movement about the axis of the pivot pins and for tilting movement in a direction crosswise of the pivot pins to allow the vehicle engaging surface on the foot members to conform to the longitudinal and transverse curvature of the surface of the vehicle.

8 Claims, 4 Drawing Figures

U.S. Patent
Feb. 21, 1984
4,432,479
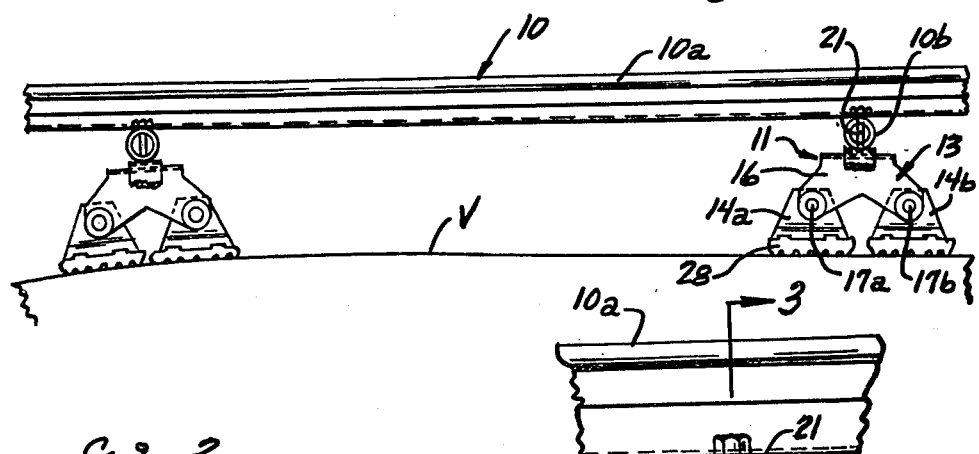
Fig. 1.
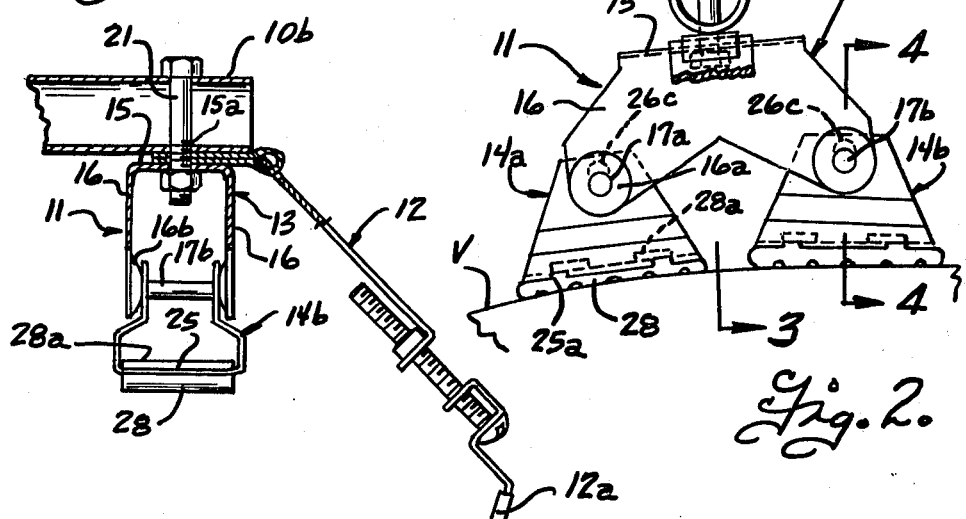
Fig. 3.
Fig. 2.
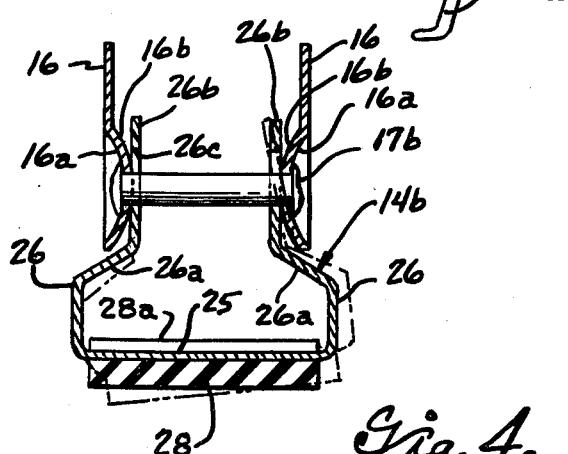
Fig. 4.

VEHICLE ATTACHED CARRIER

BACKGROUND OF THE INVENTION

The present invention relates to vehicle attached carriers of the type in which the load support such as a rack or cross bar is supported by vehicle engaging devices that rest on the surface of the roof or trunk lid of the vehicle. In some such carriers, for example as shown in U.S. Pat. Nos. 3,901,421 and 4,039,106, the vehicle engaging devices are in the form of resilient suction cups. Such resilient suction cups, however, transmit the applied load to the vehicle surface primarily through the central portion of the cup and do not distribute the applied load over the entire face area of the cup. U.S. Pat. No. 3,994,425 discloses vehicle engaging devices in the form of blocks of resilient material, such as a block of resilient foamed plastic having a keyhole shaped slot for receiving a horizontally extending frame member. Such resilient blocks also transmit the applied load to a relatively localized area on the surface of the vehicle aligned with the frame member that extends into the notch in the resilient block. U.S. Pat. No. 4,345,205 discloses rigid vehicle engaging feet that are mounted for pivotal and tilting movement relative to longitudinally extending frame members. There remained, however, a need for vehicle engaging device for vehicle attached carriers that could transmit the applied loads over a wide surface area on the vehicles, and accommodate vehicle surfaces of widely different longitudinal and transverse curvature at the location of the vehicle engaging device.

SUMMARY OF THE INVENTION

It is an object of the present invention to overcome the disadvantages of the prior vehicle attached carriers by providing vehicle engaging devices for supporting a carrier on a surface on the vehicle and which are arranged to conform to the surfaces having widely different contours and to transmit the applied load over a large surface area on the vehicle.

Accordingly, the present invention provides a vehicle attached carrier for mounting on the roof or trunk lid of a vehicle of the type including a load support, a plurality of vehicle engaging devices for supporting the load support on the vehicle, and carrier attaching means for connecting the load support to the vehicle. The vehicle engaging devices each include a load distributing member and first and second foot members. The load distributing member has a pair of relatively parallel pivot pins extending crosswise adjacent opposite ends and a means engaging the load distributing member intermediate its ends for attaching the same to the load support in a manner to transmit downwardly applied forces subtantially equally to both pivot pins. The first and second foot members each have a generally flat vehicle engaging face and a mounting portion extending above the vehicle engaging face, the mounting portions of the first and second foot members each having openings along a line generally paralleling the associated vehicle engaging face for receiving the respective one of the pivot pins, the openings being enlarged in a direction perpendicular to the vehicle engaging face of the foot member to support the foot members for pivotal movement about the axis of the respective pivot pin and for limited tilting movement in a direction crosswise of the respective pivot pins, whereby to allow the vehicle engaging faces of the first and second foot members to individually conform to the longitudinal and transverse curvature of the surface of the vehicle contacted thereby.

BRIEF DESCRIPTION OF THE DRAWINGS

FIG. 1 is a fragmentary side elevational view of a vehicle attached carrier embodying the present invention;

FIG. 2 is a fragmentary view on a larger scale than FIG. 1 and illustrating one of the vehicle engaging devices;

FIG. 3 is a fragmentary transverse sectional view taken on the plane 3—3 of FIG. 2; and FIG. 4 is a fragmentary transverse sectional view taken on the plane 4—4 of FIG. 2 and illustrating parts on a larger scale than FIG. 2.

The present invention relates to vehicle attached carriers of the type which are adapted for mounting on the surface of the roof or trunk lid of a vehicle designated V in FIGS. 1 and 2 and which include a load support designated generally by the numeral 10, a plurality of vehicle engaging devices 11 for supporting the load support on the surface of the vehicle, and a carrier attaching means 12 for connecting the load support to the vehicle. The load support 10 can be of any suitable construction and, as herein shown, includes longitudinal members 10a and cross members 10b.

In accordance with the present invention, the load support devices each include a load distributing member 13 and first and second foot members 14a and 14b. The load distributing member is a sheet metal bracket of generally U-shaped cross section having a web portion 15 and depending leg portions 16 extending downwardly from the upper web portion. A pair of pivot pins 17a and 17b extend parallel to each other between the leg portions 16 adjacent opposite ends of the bracket. The web portion 15 of the bracket has an opening 15a therethrough and a fastener such as a bolt 21 extends through the opening in the web portion of the bracket and through openings in the cross frame member 10b to attach the bracket to the load support. The opening 15a is located substantially equidistant from the pivot pins 17a and 17b and downward forces applied by the cross frame member 10b of the load support to the bracket are transmitted substantially equally to the pivot pins 17a and 17b. As shown in FIGS. 2 and 3, the carrier attaching means 12 comprises a vehicle engaging hook assembly attached as by a metal strap 23 to the load support 10 and having a hook 12a for engaging an edge or bead on a vehicle roof or trunk lid.

The foot members 14a and 14b are of like construction and like numerals are used to designate corresponding parts. The foot members are formed of sheet metal and each have a generally flat web section 25 and flanges 26 that extend upwardly from the web section. The flanges 26 have relatively converging intermediate portions 26a and relatively parallel upper portions 26b that extend between the leg portions 16 of the bracket. A pad 28 of resilient material such as rubber or the like is mounted at the underside of the web portion 25 and, as best shown in FIG. 2, the pad has oppositely directed L-shaped protrusions 28a that extend through slots 25a in the web portion of the foot members, to retain the pad on the foot members. The pads provide a generally flat vehicle engaging face at their underside and the upper portions 26b of the spaced flanges of each foot member are spaced apart a distance substantially less than the width of the vehicle engaging face. The upper flange portions 26b have openings 26c therethrough for receiving a respective one of the pivot pins and the openings are enlarged in a direction perpendicular to the web section of the foot member as shown in FIGS. 2 and 4 to support the foot members for pivotal movement about the axis of the respective pivot pin and also for limited tilting movement in a direction crosswise of the axis of the pivot pins. Thus, the foot members 14a and 14b can independently tilt relative to the brackets 10 and relative to each other about the axis of the pivot pins to allow the vehicle engaging face to conform to the longitudinal contour of the vehicle and can accommodate surface contours that are longitudinally convex, flat or longitudinally concave. Further, the foot members 14a and 14b can independently tilt in a direction crosswise of the pivot pins to conform to the transverse curvature of the vehicle surface engaged thereby. In order to facilitate transverse tilting of the vehicle engaging feet, the leg portions 16 of the brackets are formed with semi-spherical depressions 16a around the ends of each of the pivot pins, and which semi-spherical depressions provide convex inner face portions 16b that engage the upper portions 26b of the flanges of the foot members. The foot members are formed of a resilient metal and are arranged so that the upper flange portions are resiliently urged apart into engagement with the inner convex faces on the leg portions of the bracket to maintain both flanges on each foot member in firm engagement with opposed leg portions on the bracket.

From the foregoing it is believed that the construction, operation and use of the vehicle attached carrier will be readily understood. The vehicle engaging devices 13 can be attached to various different load supporting devices and the load distributing member 11 will transmit the downwardly applied loads substantially equally to both pivot pins 17a and 17b on the bracket. The foot members 14a and 14b are mounted on the pivot pins 17a and 17b for pivotal movement about the axis and also for tilting movement in a direction crosswise of the axis so that the vehicle engaging faces on the underside of the foot members 14a and 14b can independently conform to the longitudinal and transverse curvature of the vehicle at that location.

The embodiments of the invention in which an exclusive property or privilege is claimed are defined as follows:

1. In a vehicle attached carrier for mounting on the roof or trunk lid of a vehicle, the carrier including a load support, a plurality of vehicle engaging devices for supporting the load support on the surface of the vehicle, and carrier attaching means for connecting the load support to the vehicle, the improvement wherein said vehicle engaging devices each include an elongated load distributing member having a pair of relatively parallel pivot pins extending crosswise thereof adjacent opposite ends, means engaging the load distributing member intermediate its ends for attaching the same to the load support in a manner to transmit downwardly applied forces substantially equally to both pivot pins, first and second foot members each having a generally flat vehicle engaging face and a mounting portion extending above the vehicle engaging face, the mounting portions of the first and second foot members each having openings therethrough along a line generally paralleling the associated vehicle engaging face for receiving the respective one of the pivot pins, the openings being enlarged in a direction perpendicular to the vehicle engaging face of the foot member to support the foot members for pivotal movement about the axis of the respective pivot pin and for limited tilting movement in a direction crosswise of the respective pivot pin, whereby to allow the vehicle engaging faces of the first and second foot members to individually conform to the longitudinal and transverse curvature of the surface of the vehicle contacted thereby.

2. In a vehicle attached carrier according to claim 1 wherein said foot members comprise a generally U-shaped member having a lower web portion with said vehicle engaging face at the underside thereof and leg portions extending upwardly from the web portion and forming said mounting portion.

3. In a vehicle attached carrier according to claim 1 wherein said leg portions of the bracket have semi-spherical depressions in the leg portions around the end of each of the pivot pins providing convex inner face portions engaging the upper portions of the flanges on the foot members.

4. In a vehicle attached carrier according to claim 3 wherein said upper portions of the flanges on each foot member are spaced apart a distance substantially less than the width of the vehicle engaging face on the foot member.

5. In a vehicle attached carrier according to claim 3 wherein the flanges on the foot members are resiliently urged apart into engagement with the convex inner faces on the leg portions of the bracket.

6. In a vehicle attached carrier according to claim 1 wherein said upper portions of the flanges on each foot member are spaced apart a distance substantially less than the width of the vehicle engaging face on the foot member.

7. In a vehicle attached carrier for mounting on the roof or trunk lid of a vehicle, the carrier including a load support, a plurality of vehicle engaging devices for supporting the load support on the surface of a vehicle, and carrier attaching means for connecting the load support to the vehicle, the improvement wherein said vehicle engaging devices each include a load distributing member and first and second foot members, the load distributing member comprising a sheet metal bracket of generally U-shaped cross section having an upper web portion and spaced leg portions extending downwardly from the upper web portions, a pair of pivot pins extending parallel to each other between the leg portions of the bracket adjacent opposite ends, means engaging the bracket medially between its ends for attaching the bracket to the load support in a manner to transmit downwardly applied forces substantially equally to both pivot pins, the first and second sheet metal foot members each having a generally flat web section and spaced flanges extending upwardly from the web section with the upper portions of the spaced flanges extending between the spaced leg portions of the bracket, a pad on the underside of the web section of each foot member providing a resilient vehicle engaging face, the upper portions of the spaced flanges of each foot member having openings therein aligned in a direction parallel to the vehicle engaging face of the foot member for receiving a respective one of the pivot pins and the openings being enlarged in a direction perpendicular to the web section of the foot member to support the foot member for pivotal movement about the axis of the respective pivot pin and for limited tilting movement in a direction crosswise of the axis of the respective pivot pin, whereby to allow the vehicle engaging faces of the first and second foot members to independently conform to the longitudinal and transverse curvature of the surface of the vehicle contacted thereby.

8. In a vehicle attached carrier according to claim 7 wherein the web portion of the bracket has an opening therethrough at a location substantially equidistant from the pivot pins, and said means attaching the bracket to the load support includes a fastener extending through said opening.

* * * * *